US008249466B2

United States Patent
Hoshida

(10) Patent No.: US 8,249,466 B2
(45) Date of Patent: Aug. 21, 2012

(54) POLARIZATION MULTIPLEXING OPTICAL RECEIVER AND POLARIZATION MULTIPLEXING OPTICAL TRANSMISSION SYSTEM

(75) Inventor: Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 242 days.

(21) Appl. No.: 12/619,660

(22) Filed: Nov. 16, 2009

(65) Prior Publication Data

US 2010/0189438 A1 Jul. 29, 2010

(30) Foreign Application Priority Data

Jan. 29, 2009 (JP) ................................. 2009-018843

(51) Int. Cl.
*H04B 10/06* (2006.01)
(52) U.S. Cl. .......... 398/205; 398/65; 398/152; 398/209; 398/147; 398/81; 398/159; 398/212; 398/213; 398/206; 398/184; 385/11; 385/24; 385/27; 356/73.1; 359/483; 359/499; 359/497
(58) Field of Classification Search .................. 398/65, 398/152, 184, 185, 79, 33, 38, 34, 158, 159, 398/147, 205, 206, 208, 209, 202, 210, 212, 398/213, 214, 203, 204, 207, 81, 74, 135, 398/136, 137, 138, 139, 25, 26, 27; 385/24, 385/11, 15, 27; 356/73.1; 359/483, 499, 359/495, 497
See application file for complete search history.

(56) References Cited

U.S. PATENT DOCUMENTS

| 5,111,322 | A | 5/1992 | Bergano | |
|---|---|---|---|---|
| 6,999,688 | B1* | 2/2006 | Hui et al. | 398/205 |
| 7,796,894 | B1* | 9/2010 | Yao | 398/159 |
| 8,045,856 | B2* | 10/2011 | Shen et al. | 398/65 |
| 2005/0265727 | A1* | 12/2005 | Glingener | 398/152 |

FOREIGN PATENT DOCUMENTS

| JP | H05-136761 A | 6/1993 |
|---|---|---|
| JP | H05-327576 A | 12/1993 |
| JP | 2002-344426 A | 11/2002 |

OTHER PUBLICATIONS

Ito, Toshiharu et al.,"Comparison of 100Gb/s transmission performances between RZ-DQPSK and polarization multiplexed NRZ/RZ-DPSK with automatic polarization de-multiplexer" *OFC/NFOEC* 2008.
S., Hinz et al.,"Interference detection enabling 2×20Gbit/s RZ polarization division multiplex transmission",*Electronics Letters* Apr. 12, 2001, 511-512.
Yagi, Mikio et al.,"Field Trial of 214-km-long 160-Gbit/s Polarization—Division Multiplexed RZ-DQPSK Transmission System using Automatic Polarization Control",*IEICE* 2008, S-98-S-99.

* cited by examiner

*Primary Examiner* — Hanh Phan
(74) *Attorney, Agent, or Firm* — Fujitsu Patent Center

(57) ABSTRACT

A polarization multiplexing optical receiver includes a polarization controller configured to control a polarization state of a polarization multiplexed optical signal; a polarization splitter configured to split the polarization multiplexed optical signal for which the polarization state is controlled by the polarization controller into a first polarization signal and a second polarization signal; a first detector configured to detect an optical power of the first polarization signal and output a first optical power signal representing the optical power of the first polarization signal; a second detector configured to detect an optical power of the second polarization signal and output a second optical power signal representing the optical power of the second polarization signal; and a controller configured to control the polarization controller on the basis of the first optical power signal and the second optical power signal.

8 Claims, 9 Drawing Sheets

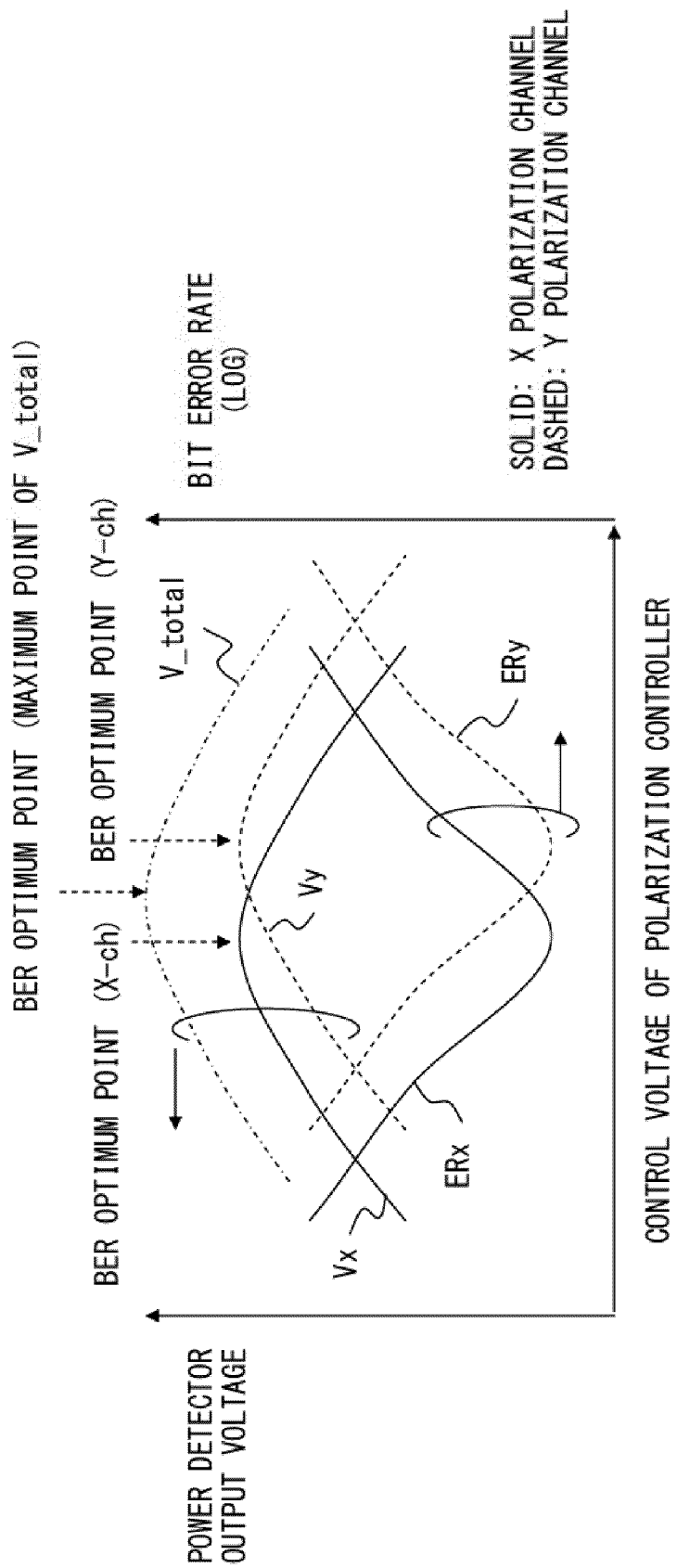
F I G. 7

POLARIZATION MULTIPLEXING OPTICAL RECEIVER AND POLARIZATION MULTIPLEXING OPTICAL TRANSMISSION SYSTEM

CROSS-REFERENCE TO RELATED APPLICATION

This application is based upon and claims the benefit of priority of the prior Japanese Patent Application No. 2009-018843, filed on Jan. 29, 2009, the entire contents of which are incorporated herein by reference.

FIELD

The present invention relates to a polarization multiplexing optical transmission system which transmits a polarization multiplexed optical signal via an optical fiber transmission line, and to a polarization multiplexing optical receiving circuit and a polarization multiplexing optical receiver used in the polarization multiplexing optical transmission system.

BACKGROUND

With the spread of the Internet, development of large capacity optical communication systems has been promoted. In a trunk system, for example, research has been conducted on an optical transmitter and an optical receiver that are capable of transmitting signals over 40 Gbit/s per wavelength. Further, there has been an increase in research and development on a polarization multiplexing transmission system to improve spectrum use efficiency of wavelength multiplexing transmission.

In a polarization multiplexing optical transmission system, a set of data signals are transmitted by utilizing X polarization and Y polarization (H/V polarizations). The X polarization and the Y polarization are a pair of orthogonal polarizations. In an optical receiver, a set of data signals are extracted by separating the X polarization and the Y polarization from each other. Therefore, the polarization multiplexing transmission system enables the capacity per wavelength to double.

A polarization multiplexing optical receiver generally has a polarization control function to control a polarization state of an input optical signal and has a separating function to obtain orthogonal polarizations (X polarization channel and Y polarization channel) of the polarization-controlled optical signal. The X polarization channel and the Y polarization channel are separated by properly adjusting the polarization control function. Methods to separate orthogonal polarization channels in a polarization multiplexing optical receiver are described in, for example, S. Hinz et al., "Interference detection enabling 2×20 Gbit/s RZ polarization division multiplex transmission", Electronics Letters, Vol. 37, No. 8, pp. 510-511, April 2001; Yagi et al., "Field Trial of 214-km-long 160-Gbit/s Polarization-Division Multiplexed RZ-DQPSK Transmission System using Automatic Polarization Control" IEICE General Conference, BS-7-9, 2008; and Ito et al., "Comparison of 100 Gbit/s transmission performances between RZ-DQPSK and polarization multiplexed NRZ/RZ-DPSK with automatic polarization de-multiplexer", OFC/NFOEC 2008, JThA46 (non-patent documents 1-3). Related technologies are also disclosed in Japanese Laid-open Patent Publication No. 05-136761, Japanese Laid-open Patent Publication No. 05-327576, and Japanese Laid-open Patent Publication No. 2002-344426 (patent documents 1-3).

In the conventional technology, the X polarization channel and the Y polarization channel have not necessarily been properly separated. Especially in an environment in which the orthogonality between the X polarization channel and the Y polarization channel is deteriorated by, for example, polarization dependent loss, it has been difficult to ensure the quality of both data signals transmitted by the X polarization channel and the Y polarization channel. In the conventional polarization multiplexing optical transmission system, for example, even if the quality of one received data signal is high, that of the other may sometimes be lower.

SUMMARY

According to an aspect of the invention, a polarization multiplexing optical receiver includes a polarization controller configured to control a polarization state of a polarization multiplexed optical signal; a polarization splitter configured to split the polarization multiplexed optical signal for which the polarization state is controlled by the polarization controller into a first polarization signal and a second polarization signal; a first detector configured to detect an optical power of the first polarization signal and output a first optical power signal representing the optical power of the first polarization signal; a second detector configured to detect an optical power of the second polarization signal and output a second optical power signal representing the optical power of the second polarization signal; and a controller configured to control the polarization controller on the basis of the first optical power signal and the second optical power signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating polarization control in the presence of polarization dependent loss;

DESCRIPTION OF EMBODIMENTS

Figure 1:
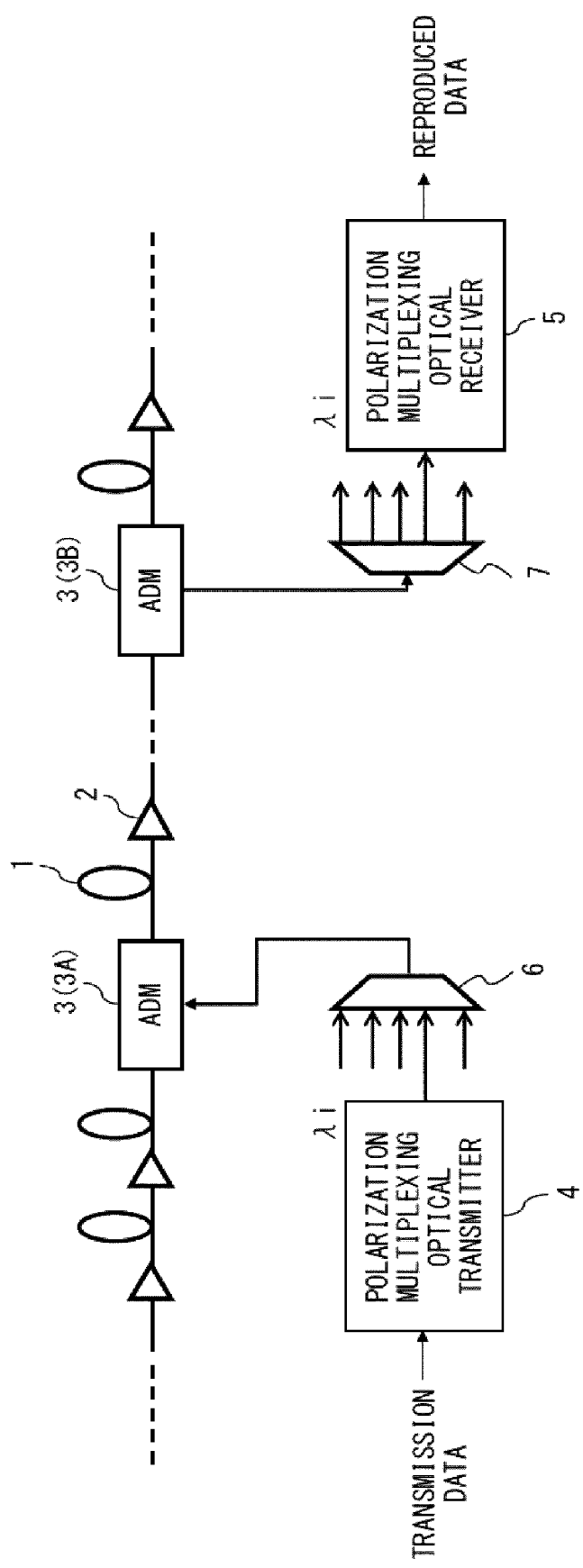
FIG. 1 is a diagram illustrating the configuration of an optical transmission system in which a polarization multiplexing optical receiver of an embodiment is used.

FIG. 1 is a diagram illustrating the configuration of an optical transmission system in which a polarization multiplexing optical receiver of an embodiment is used. The optical transmission system illustrated in FIG. 1 transmits an optical signal utilizing wavelength division multiplexing (WDM) and polarization multiplexing.

A transmission line 1, which is an optical fiber transmission line, transmits a wavelength multiplexed signal. A wavelength multiplexed signal transmits a plurality of signals utilizing a plurality of wavelengths. An optical relay amplifier (optical repeater) 2 is provided on the transmission line 1 as needed. The optical relay amplifier 2 can be (but is not particularly limited to), for example, an EDF and/or Raman amplifier. The optical relay amplifier 2 may amplify the plurality of signals contained in the wavelength multiplexed signal collectively.

An optical add-drop multiplexer (OADM) 3 has functions to add and drop an optical signal to and from the transmission line 1. In the configuration illustrated in FIG. 1, the optical add-drop multiplexer 3 adds and drops an optical signal of wavelength λi to and from the transmission line 1. Further, the optical add-drop multiplexer 3 may add/drop a plurality of wavelengths.

A polarization multiplexing optical transmitter 4 generates a polarization multiplexed optical signal for transmitting data. In this example, a polarization multiplexed optical signal of wavelength λi is generated. The polarization multiplexed optical signal transmits a set of data by utilizing orthogonal polarization channels (X polarization channel and Y polarization channel). The polarization multiplexed optical signal generated by the polarization multiplexing optical transmitter 4 is added to the transmission line 1 by an optical add-drop multiplexer 3A. The polarization multiplexed optical signal of wavelength λi dropped from the transmission line 1 by an optical add-drop multiplexer 3B is received by a polarization multiplexing optical receiver 5. The polarization multiplexing optical receiver 5 splits the polarization multiplexed optical signal into X polarization signal and Y polarization signal, and reproduces transmission data respectively from each polarization signal.

The polarization multiplexed optical signal generated by the polarization multiplexing optical transmitter 4 may be multiplexed with an optical signal of another wavelength by a wavelength multiplexer 6. On the receiving side, in a case where a plurality of wavelengths is collectively dropped by the optical add-drop multiplexer 3B, the wavelength λi is demultiplexed by a wavelength demultiplexer 7. Further, a wavelength multiplexed signal transmitted via the transmission line 1 may include a non-polarization multiplexed optical signal. In addition, a wavelength cross connect may be provided in place of the optical add-drop multiplexer 3.

As described, in the example illustrated in FIG. 1, the polarization multiplexed optical signal generated by the polarization multiplexing optical transmitter 4 is transmitted via the transmission line 1 and received by the polarization multiplexing optical receiver 5. However, such a configuration is an example only and the environment in which the polarization multiplexing optical receiver 5 is used is not limited thereto. For example, the polarization multiplexed optical signal may be transmitted without utilizing wavelength multiplexing system.

Figure 2:
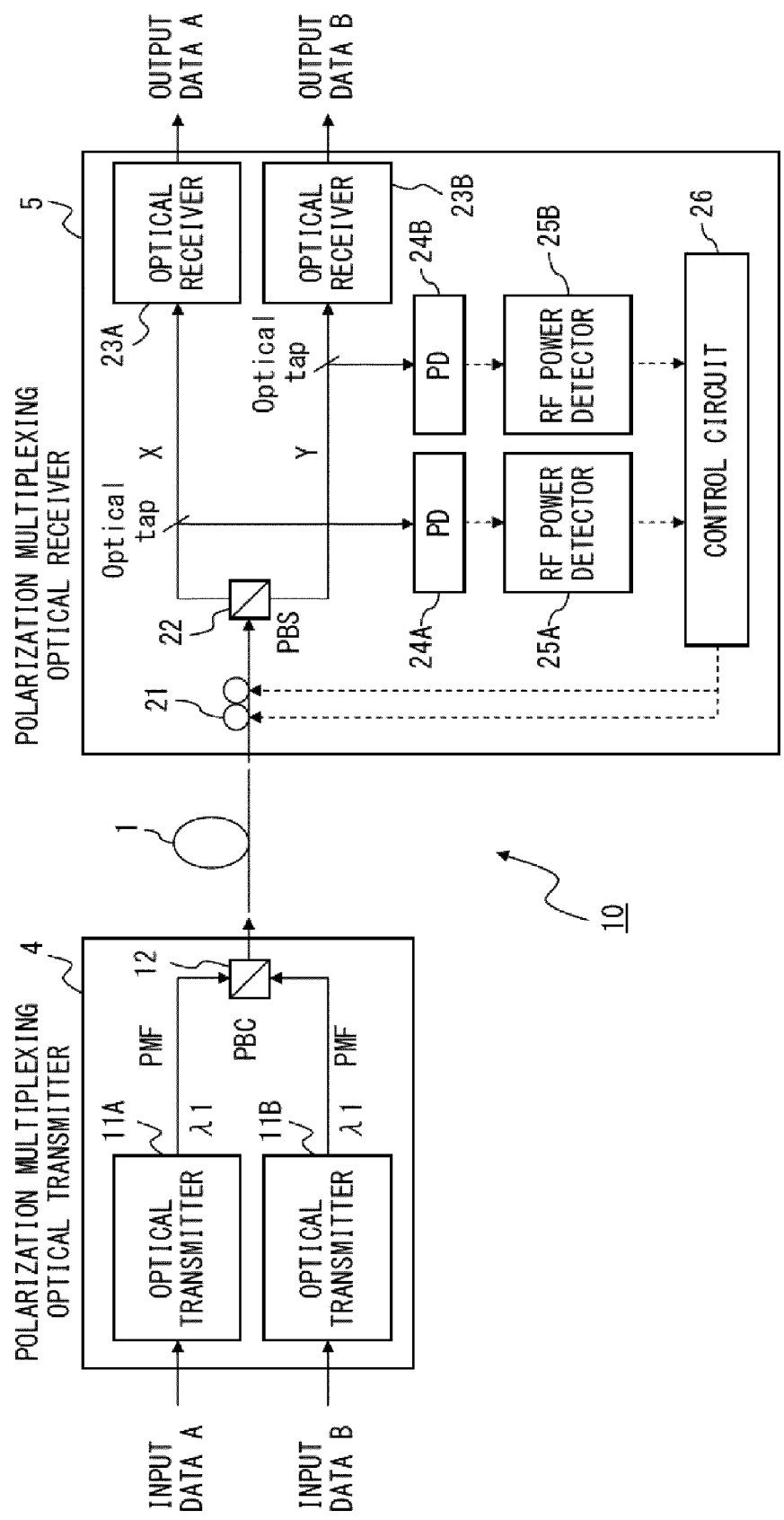
FIG. 2 is a diagram illustrating a polarization multiplexing optical transmission system of an embodiment.

FIG. 2 is a diagram illustrating the configuration of a polarization multiplexing optical transmission system of an embodiment. The polarization multiplexing optical transmission system 10 illustrated in FIG. 2 has a polarization multiplexing optical transmitter 4 and a polarization multiplexing optical receiver 5, and a polarization multiplexed optical signal is transmitted via a transmission line 1.

The polarization multiplexing optical transmitter 4 has optical transmitters 11A and 11B and a polarization beam combiner (PBC) 12. Data A and data B are respectively input to the optical transmitters 11A and 11B. The data A and the data B are, for example, mutually independent information. Alternatively, the data A and the data B may be obtained by splitting a single data stream. The optical transmitter 11A generates an optical signal A for transmitting data A, while the optical transmitter 11B generates an optical signal B for transmitting data B. Here, wavelengths of the optical signals A and B are identical to each other (λ1, in this example). A modulation scheme by the optical transmitters 11A and 11B may be (but is not particularly limited to), for example, DQPSK. Further, the optical signals A and B are output respectively in a certain polarization state (linear polarization, for example).

The optical signals A and B are directed to the polarization beam combiner 12 via polarization maintaining fibers (PMFs). The polarization beam combiner 12 generates a polarization multiplexed optical signal by combining the optical signals A and B. In this case, for example, the optical signals A and B are transmitted by utilizing X polarization and Y polarization, respectively. In other words, data A is transmitted by utilizing an X polarization channel, while data B is transmitted by utilizing a Y polarization channel. The X polarization channel and the Y polarization channel are orthogonal to each other. Further, it is assumed that the transmission powers of the X polarization channel and the Y polarization channel are identical to each other.

The polarization multiplexed optical signal generated by the polarization multiplexing optical transmitter 4 is transmitted via the transmission line 1 and received by the polarization multiplexing optical receiver 5. The polarization multiplexing optical receiver 5 has a polarization controller 21, a polarization beam splitter (PBS) 22, optical receivers 23A and 23B, photo detectors (PD) 24A and 24B, RF power detectors 25A and 25B, and a control circuit 26.

The polarization controller 21 controls the polarization state of the input polarization multiplexed optical signal in response to a control signal from the control circuit 26. The polarization controller 21 may have (but is not particularly limited to), for example, a λ/2 wave plate and a λ/4 wave plate. In this case, the λ/2 wave plate and the λ/4 wave plate are adjusted in response to the control signal from the control circuit 26, and the polarization of the input polarization multiplexed optical signal is controlled to be a desired state.

The polarization beam splitter 22 splits the polarization multiplexed optical signal for which the polarization state is controlled by the polarization controller 21 into two orthogonal polarizations. The two polarizations obtained by the polarization beam splitter 22 are hereinafter referred to as X polarization channel signal and Y polarization channel signal.

The X polarization channel signal and the Y polarization channel signal are directed respectively to the optical receivers 23A and 23B. The optical receiver 23A reproduces data A by demodulating the X polarization channel signal. Similarly, the optical receiver 23B reproduces data B by demodulating the Y polarization channel signal.

The X polarization channel signal and the Y polarization channel signal output from the polarization beam splitter 22 are tapped and directed respectively to the photo detectors 24A and 24B. Each splitting rate for tapping the X polarization channel signal and the Y polarization channel signal is essentially identical. The photo detectors 24A and 24B are, for example, photo diodes, and respectively convert the X polarization channel signal and the Y polarization channel signal into electrical signals. RF power detectors 25A and 25B respectively detect the power of each of the output signals of the photo detectors 24A and 24B. The power of the signal is detected by, for example, squaring the signal. Therefore, powers of the X polarization channel signal and the Y polarization channel signal are detected by the RF power detectors 25A and 25B. Then RF power detector 25A outputs a X polarization power signal representing the optical power of the X polarization channel signal, while the RF power detector 25B outputs a Y polarization power signal representing the optical power of the Y polarization channel signal. The X polarization power signal and the Y polarization power signal are provided to the control circuit 26.

The control circuit 26 generates a control signal to control the polarization controller 21 by utilizing both the X polarization power signal and the Y polarization power signal. In other words, feedback control which utilizes the power of both the X polarization channel and the Y polarization channel is performed.

Figure 3:
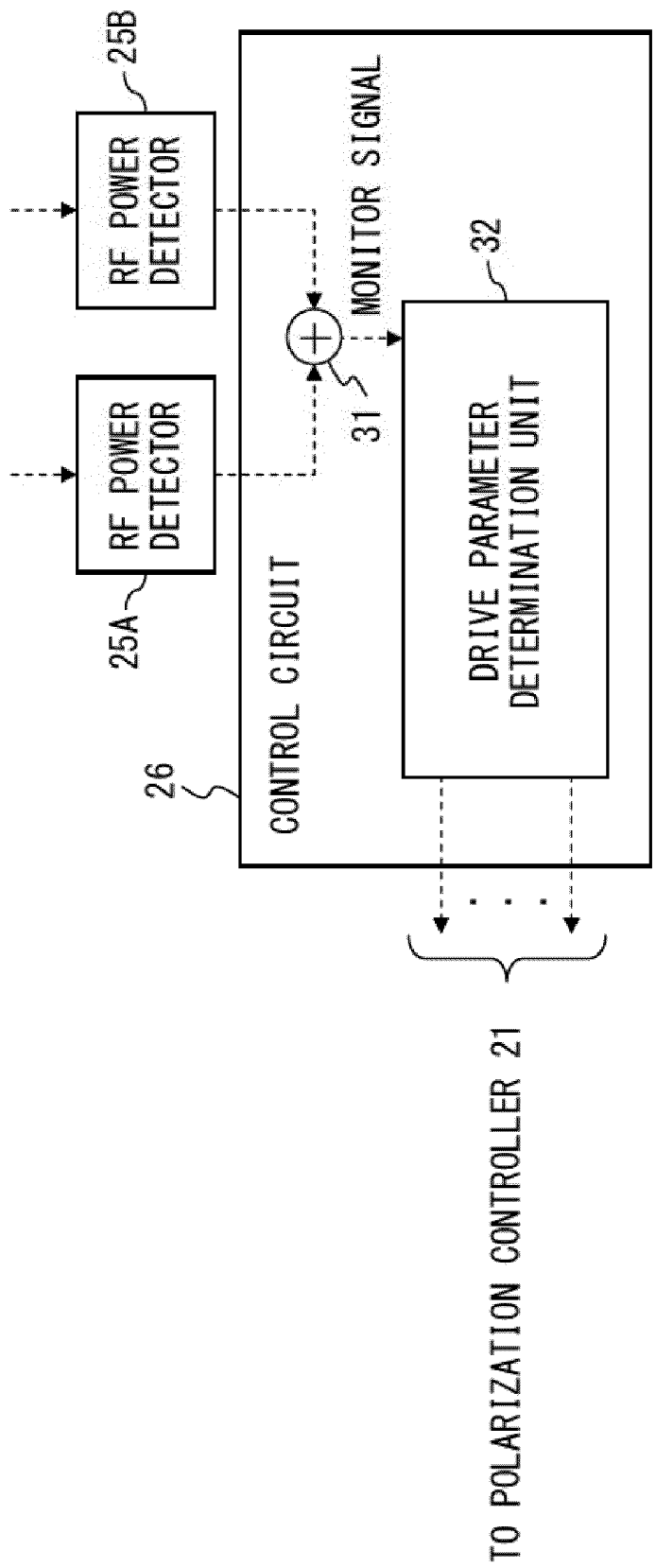
FIG. 3 illustrates an example of a control circuit.

FIG. 3 illustrates an example of the control circuit 26. As described with reference to FIG. 2, X polarization power signal and Y polarization power signal generated by the RF power detectors 25A and 25B are provided to the control circuit 26. The X polarization power signal represents the optical power of the X polarization channel extracted from the input polarization multiplexed optical signal. Similarly, the Y polarization power signal represents the optical power of the Y polarization channel extracted from the input polarization multiplexed optical signal.

The control circuit 26 has an adder circuit 31 and a drive parameter determination unit 32. The adder circuit 31 adds the X polarization power signal and the Y polarization power signal together, and generates a monitor signal representing the result of addition. The generated monitor signal is input to the drive parameter determination unit 32. On the basis of this monitor signal, the drive parameter determination unit 32 determines a drive parameter so as to control the polarization controller 21. Then the drive parameter determination unit 32 controls the polarization controller 21 with the control signal representing the determined drive parameter. The drive parameter is used, for example, to adjust the λ/2 wave plate and the λ/4 wave plate. If the λ/2 wave plate and the λ/4 wave plate are adjusted by voltage, the control signal is realized by a drive voltage corresponding to the determined drive parameter.

The control circuit 26 may be realized by (but is not particularly limited to), for example, a digital signal processor. In this case, output signals of the RF power detectors 25A and 25B (i.e., X polarization power signal and Y polarization power signal) are respectively converted into digital data by an A/D converter. Then the adder circuit 31 executes the adding operation so as to add a pair of digital data together, and generates a digital monitor signal. Further, the drive parameter determination unit 32 executes a predetermined operation using the digital monitor signal and determines the drive parameter. The control circuit 26 may be implemented as an analog circuit.

Figure 4:
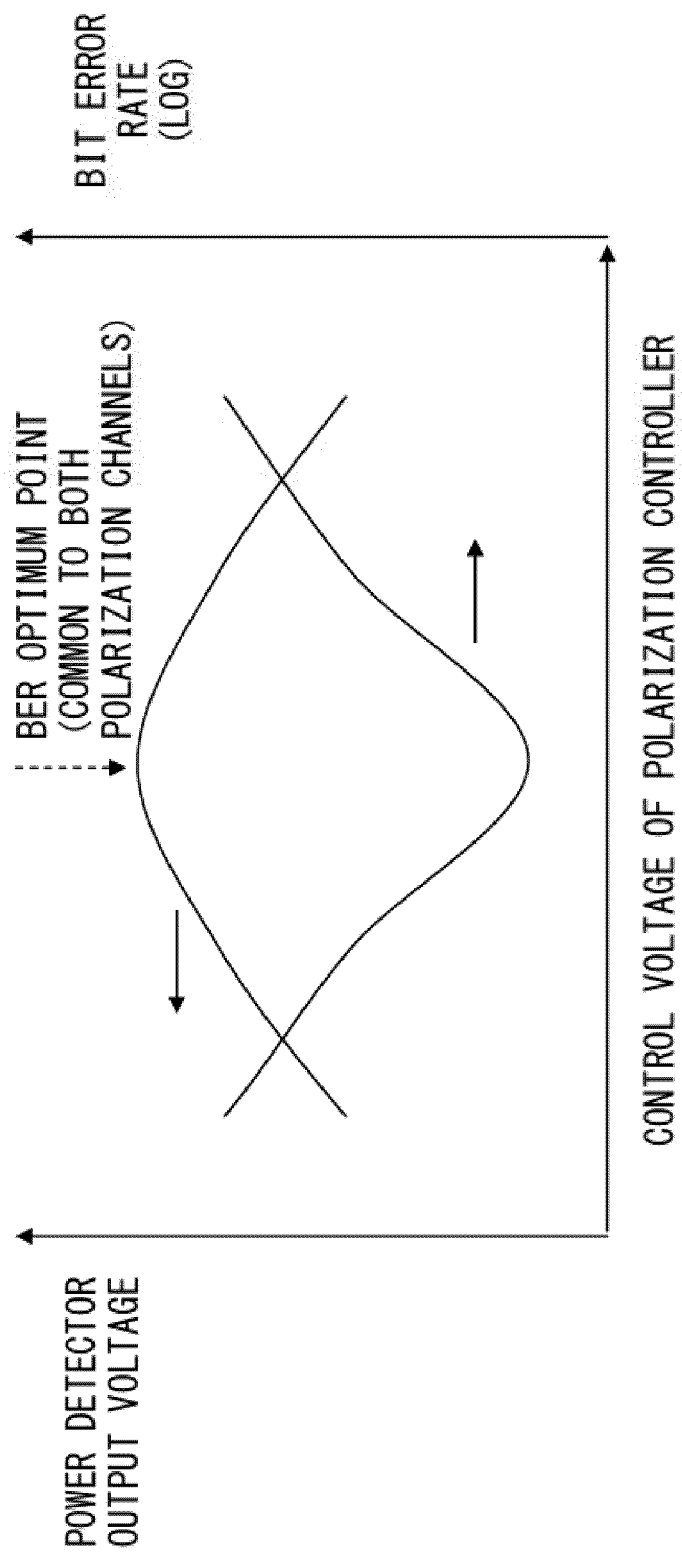
FIG. 4 is a diagram illustrating control of a polarization state.

FIG. 4 is a diagram illustrating control of the polarization state. Here it is assumed that there is no polarization dependent loss (PDL) in the transmission line 1 between the polarization multiplexing optical transmitter 4 and the polarization multiplexing optical receiver 5. When the polarization multiplexed optical signal is transmitted from the polarization multiplexing optical transmitter 4, the X polarization channel and the Y polarization channel are orthogonal to each other. Therefore, when there is no polarization dependent loss, the X polarization channel and the Y polarization channel of the polarization multiplexed optical signal input to the polarization multiplexing optical receiver 5 are also orthogonal to each other.

In FIG. 4, a horizontal axis represents the control voltage of the polarization controller 21. In this example, the polarization state of the input polarization multiplexed optical signal is controlled by the control voltage of the polarization controller 21. Therefore, the horizontal axis substantially represents the polarization state (or polarization direction) of the input polarization multiplexed optical signal. The vertical axes represent output voltages of the RF power detectors 25A and 25B, and a bit error rate of the reproduced data, respectively. The output voltages of the RF power detectors 25A and 25B correspond to powers of the X polarization channel signal and the Y polarization channel signal.

Hereinafter, the X polarization channel will be described. As the polarization state of the polarization multiplexed optical signal changes according to the control voltage of the polarization controller 21, the output voltage of the RF power detector (25A, in FIG. 2) representing the optical power of the X polarization channel also changes. The bit error rate also changes according to the polarization state of the polarization multiplexed optical signal. At this time, in the example illustrated in FIG. 4, the output voltage of the RF power detector is maximized when the bit error rate is minimized. Therefore, adjusting the control voltage of the polarization controller 21 so that the output voltage of the RF power detector is maximized may lower the bit error rate. Note that the above-described feedback control may also be performed on the Y polarization channel.

However, the transmission line 1 generally has polarization dependent loss. In this case, the X polarization channel and the Y polarization channel detected at the polarization multiplexing optical receiver 5 are not orthogonal to each other.

Figure 5:
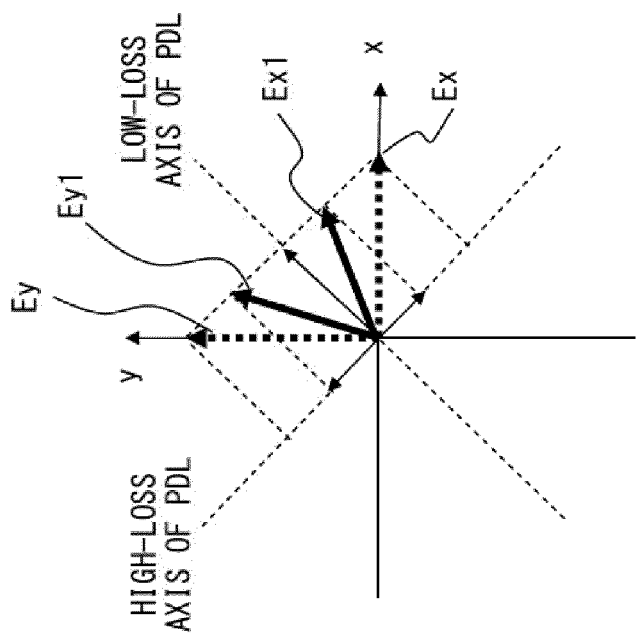
FIG. 5 is a diagram illustrating an effect of polarization dependent loss.
Figure 5:
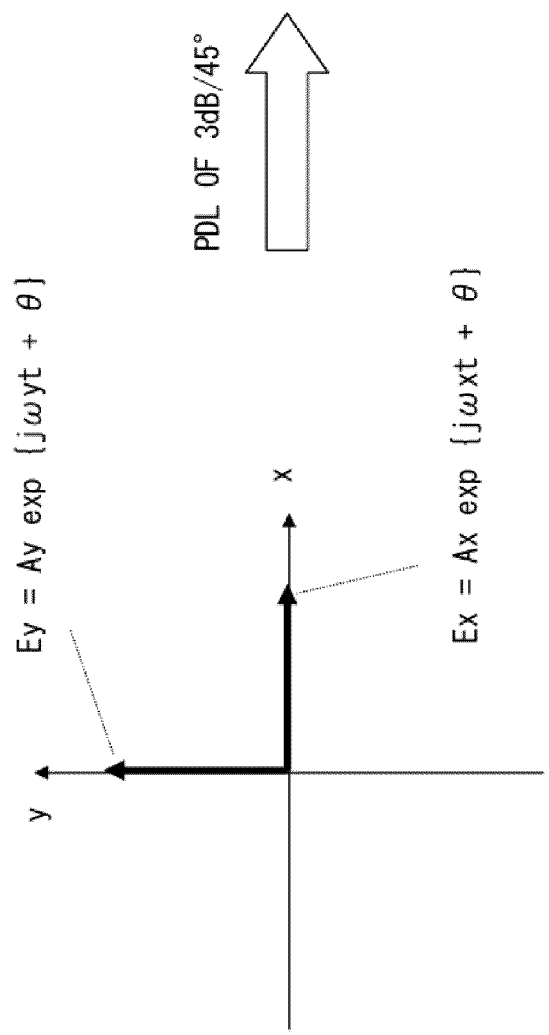

FIG. 5 is a diagram illustrating an effect of polarization dependent loss. Here, it is assumed that the polarization dependent loss of the transmission line 1 is 3 dB/45 degrees. Electric fields of the X polarization channel and the Y polarization channel transmitted by the polarization multiplexing optical transmitter 4 are orthogonal to each other. Further, it is assumed that the transmission powers of the X polarization channel and the Y polarization channel are identical to each other.

The polarization multiplexed optical signal input to the polarization multiplexing optical receiver 5 has been affected by the polarization dependent loss (3 dB, 45 degrees). Here, the electric field Ex of the X polarization channel is resolved into the components of a low-loss axis and a high-loss axis of the polarization dependent loss. In this example, it is assumed that the low-loss axis is at a 45 degree angle to the x-axis and the high-loss axis is perpendicular to the low-loss axis. The amount of loss in the low-loss axis is zero, and that in the high-loss axis is 3 dB.

In this case, the high-loss axis component of the electric field becomes smaller, while the low-loss axis component of the electric field is unchanged. Therefore, the electric field Ex1 of the X polarization channel input to the polarization multiplexing optical receiver 5 has a different direction from the electric field Ex as illustrated in FIG. 5. Similarly, the electric field Ey1 of the Y polarization channel input to the polarization multiplexing optical receiver 5 has a different direction from the electric field Ey. As a result, the electric fields Ex1 and Ey1 are not orthogonal to each other.

Next, the polarization control in the presence of polarization dependent loss is described. Here, the polarization state of the input polarization multiplexed optical signal is controlled so as to optimize a characteristic of either the X polarization channel or the Y polarization channel, for example. In the following description, it is assumed that the polarization beam splitter 22 has an X polarization extraction axis for extracting the X polarization channel and a Y polarization extraction axis for extracting the Y polarization channel, and the characteristic of the X polarization channel is optimized.

Figure 6A:
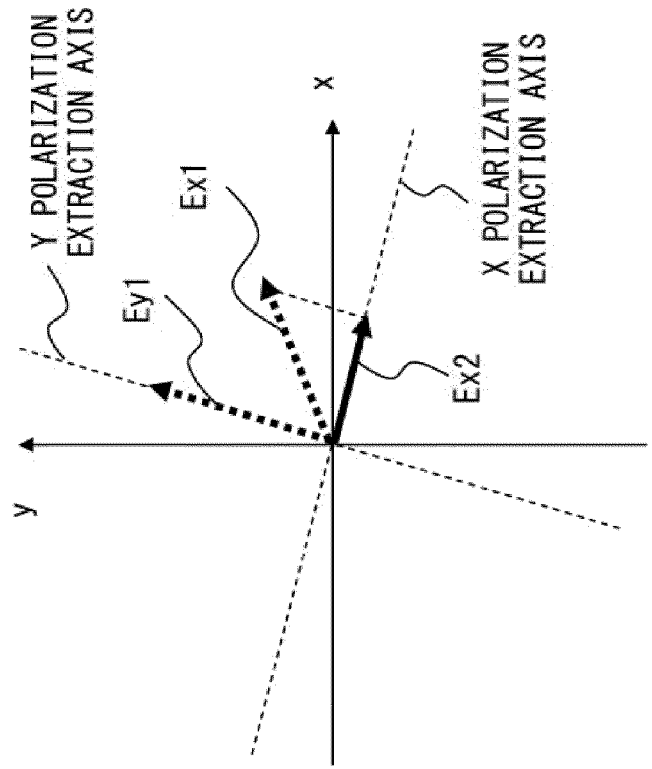
FIGS. 6A and 6B are diagrams illustrating an example of polarization control.

In this case, as illustrated in FIG. 6A, the polarization state of the input polarization multiplexed optical signal is controlled so that the electric field Ey1 is to be perpendicular to the X polarization extraction axis. According to this polarization control, the X polarization channel extracted by the polarization beam splitter 22 does not include the electric field component Ey1. In other words, in the polarization beam splitter 22, the component (electric field Ex2, in FIG. 6A) obtained by projecting the electric field Ex1 on the X polarization extraction axis is extracted for the X polarization channel. Therefore, the X polarization channel is not affected by the crosstalk from the Y polarization channel and thus the bit error rate of the reproduced data in the X polarization channel is lowered.

Figure 6B:
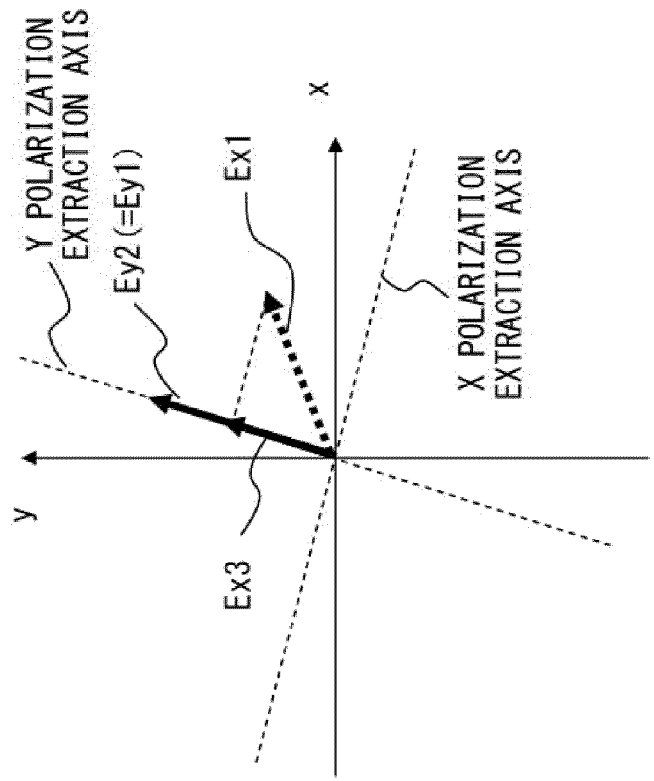

However, if the polarization state of the input polarization multiplexed optical signal is controlled as described above, the electric field Ex1 is not perpendicular to the Y polarization extraction axis. Therefore, the Y polarization channel extracted in the polarization beam splitter 22 includes the electric field Ex3 as illustrated in FIG. 6B. The electric field Ex3 corresponds to the component obtained by projecting the electric field Ex1 on the Y polarization extraction axis. In this case, the Y polarization channel may be affected by the crosstalk from the X polarization channel and thus the bit error rate of the reproduced data in the Y polarization channel may be deteriorated.

In this way, in the method for controlling the polarization state of the input polarization multiplexed optical signal so as to optimize the characteristic of either the X polarization channel or Y polarization channel, when there is polarization dependent loss, the quality of the other polarization channel may be severely deteriorated.

FIG. 7 is a diagram illustrating the polarization control in the presence of polarization dependent loss. When there is polarization dependent loss, according to the method illustrated in FIGS. 6A and 6B, a feedback control which maximizes the output voltage of the RF power detector 25A (voltage Vx, in FIG. 7) is performed, for the purpose of controlling the polarization state so as to optimize the X polarization channel. In other words, the control voltage of the polarization controller 21 is generated so as to maximize the voltage Vx. Then the bit error rate of the X polarization channel (ERx, in FIG. 7) becomes smaller. However, if the polarization of the input polarization multiplexed optical signal is controlled by such a feedback system, the bit error rate of the Y polarization channel (ERy, in FIG. 7) may be severely deteriorated. Therefore, the overall quality of data transmitted by the polarization multiplexed optical signal (X and Y polarization channels) is deteriorated.

In contrast, in the polarization multiplexing optical receiver 5 with the control circuit 26 illustrated in FIG. 3, the polarization state of the input polarization multiplexed optical signal is controlled on the basis of the monitor signal obtained by adding the X polarization power signal and the Y polarization power signal together. In the example, the feedback control is performed by the control circuit 26, which maximizes the sum (voltage V_total, in FIG. 7) of the output voltage Vx of the RF power detector 25A and the output voltage Vy of the RF power detector 25B. Then the bit error rates of the X polarization channel and the Y polarization channel become approximately equal. In other words, according to the method of the embodiment, although the bit error rate of the X polarization channel may be slightly deteriorated, the bit error rate of the Y polarization channel may be significantly improved compared to the method illustrated in FIGS. 6A and 6B. As a result, the overall quality of data transmitted by the polarization multiplexed optical signal (X and Y polarization channels) is improved.

In the example illustrated in FIG. 7, it is assumed that the output voltage Vx of the RF power detector 25A increases when the optical power of the X polarization channel is high (or, the output voltage Vy of the RF power detector 25B increases when the optical power of the Y polarization channel is high). However, the configuration of the RF power detectors 25A and 25B is not particularly limited and may incorporate, for example, an inverting amplifier. Depending on the number of stages of the inverting amplifier, the output voltage Vx of the RF power detector 25A decreases when the optical power of the X polarization channel is high (alternately, the output voltage Vy of the RF power detector 25B decreases when the optical power of the Y polarization channel is high). In this case, the control circuit 26 controls the polarization of the input polarization multiplexed optical signal so as to minimize the voltage V_total.

As described above, in the polarization multiplexing optical receiver 5 of the embodiment, the polarization state of the input polarization multiplexed optical signal is controlled so that the sum of the signals representing the optical powers of the X polarization channel and the Y polarization channel may be maximized or minimized. In other words, the polarization state of the input polarization multiplexed optical signal is controlled so that the sum of the signals representing the optical powers of the X polarization channel and the Y polarization channel may approach an extremum (local maximum or local minimum).

Further, the method by which the control circuit 26 controls the polarization controller 21 is not particularly limited to the ones presented here, but may utilize the known technique. For example, a dithering method may be used. More specifically, the following procedure may be repeatedly executed in a predetermined cycle. Here, it is assumed that the polarization of the input polarization multiplexed optical signal is "θ".

(1) Rotate the polarization of the input polarization multiplexed optical signal by "+Δθ" and detect the monitor signal M1 output from the adder circuit 31.
(2) Rotate the polarization of the input polarization multiplexed optical signal by "−Δθ" and detect the monitor signal M2 output from the adder circuit 31.
(3a) Adjust the polarization of the input polarization multiplexed optical signal to "θ−Δθ" if M2 is larger than M1.
(3b) Adjust the polarization of the input polarization multiplexed optical signal to "θ+Δθ" if M2 is smaller than M1.
(3c) Keep the polarization of the input polarization multiplexed optical signal as "θ" if the difference between M1 and M2 is less than a predetermined value (or, if the difference is substantially zero).

Figure 8B:
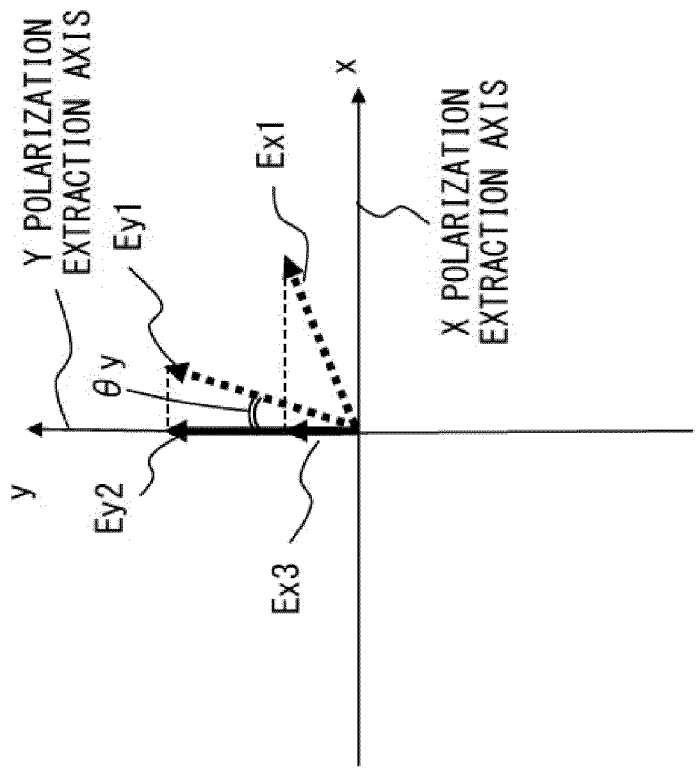
FIGS. 8A and 8B are diagrams illustrating polarization control in a polarization multiplexing optical receiver of an embodiment.
Figure 8A:
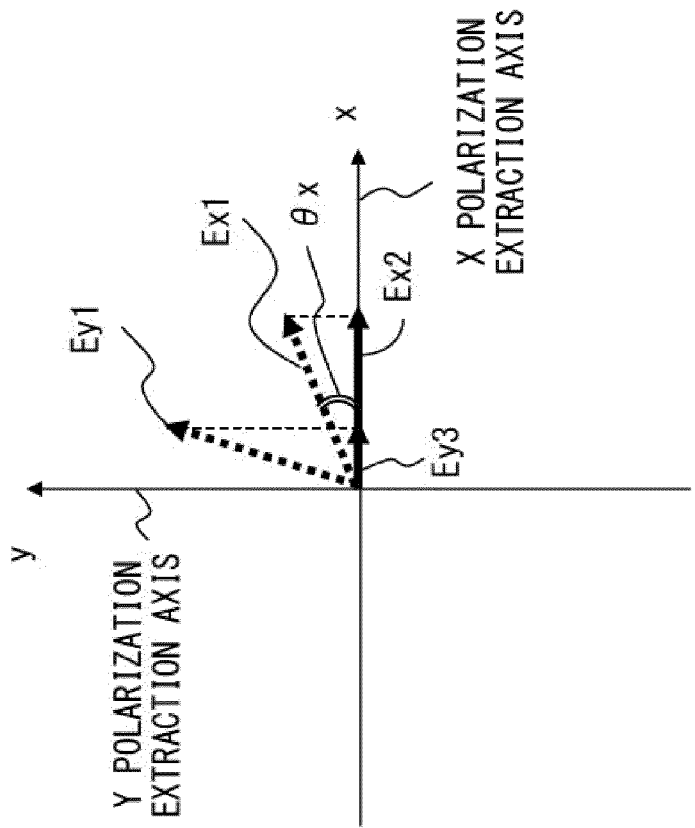

FIGS. 8A and 8B are diagrams illustrating the polarization control in the polarization multiplexing optical receiver of the embodiment. In the following description, it is assumed that the polarization dependent loss of the transmission line 1 is 3 dB/45 degrees, as with the example illustrated in FIG. 5. Therefore, the electric fields of the X polarization channel and the Y polarization channel of the input polarization multiplexed optical signal are Ex1 and Ey1, respectively.

In this case, when a feedback control which makes the monitor signal output from the adder circuit 31 approach an extremum (maximum, in FIG. 7) is performed, θx and θy respectively illustrated in FIGS. 8A and 8B become substantially identical to each other. Here, θx represents an angle between the X polarization extraction axis of the polarization beam splitter 22 and the electric field Ex1, while θy represents an angle between the Y polarization extraction axis of the polarization beam splitter 22 and the electric field Ey1. Thus, the polarization state of the input polarization multiplexed optical signal is controlled so that θx and θy may be substantially identical to each other.

The X polarization channel extracted by the polarization beam splitter 22 includes, as illustrated in FIG. 8A, the electric field Ex2, which is a projected component of the electric field Ex1 on the X polarization extraction axis, and the electric field Ey3, which is a projected component of the electric field Ey1 on the X polarization extraction axis. Similarly, the Y polarization channel extracted by the polarization beam splitter 22 includes, as illustrated in FIG. 8B, the electric field Ey2, which is a projected component of the electric field Ey1 on the Y polarization extraction axis, and the electric field Ex3, which is a projected component of the electric field Ex1 on the Y polarization extraction axis. Here, θx and θy are substantially identical to each other, as described above. Therefore, a crosstalk component of the X polarization channel (i.e. Ey3) and that of the Y polarization channel (i.e. Ex3) is substantially identical to each other. As a result, the bit error rates of the X polarization channel and the Y polarization channel become substantially identical to each other.

Further, in the extracted X polarization channel, the crosstalk component Ey3 is sufficiently small compared to the electric field Ex2, which is a principal component of the X polarization channel. Similarly, in the extracted Y polarization channel, the crosstalk component Ex3 is sufficiently small compared to the electric field Ey2, which is a principal component of the Y polarization channel. Therefore, in both of the X polarization channel and the Y polarization channel, the effect of the crosstalk may be suppressed and the bit error rate decreases. As a result, the bit error rates of both of the X polarization channel and the Y polarization channel may be kept low and the overall bit error rate may be minimized.

Figure 9:
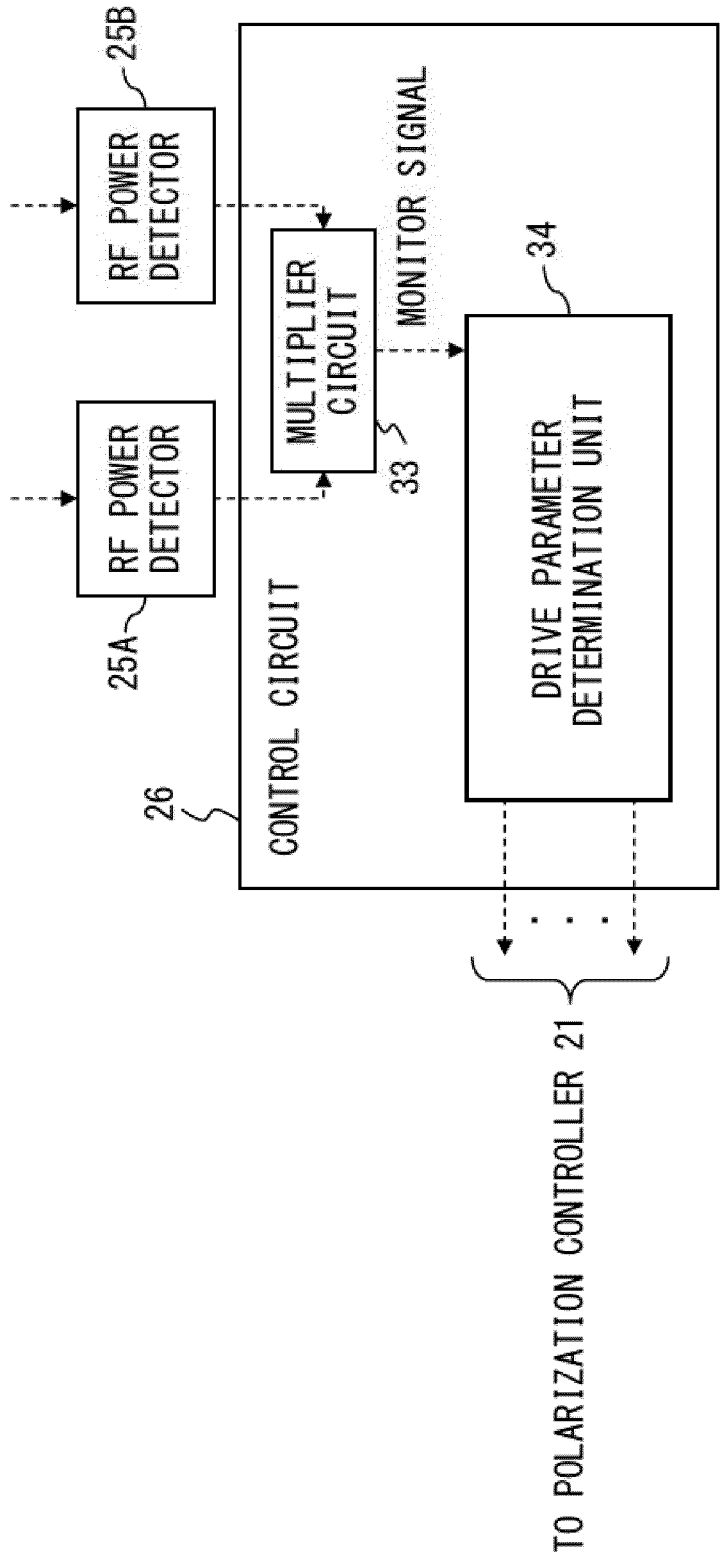
FIG. 9 illustrates another example of a control circuit.

FIG. 9 is a diagram illustrating another example of the control circuit 26. This control circuit 26 has a multiplier circuit 33 and a drive parameter determination unit 34. Also in this configuration, the X polarization power signal and the Y polarization power signal generated respectively by the RF power detectors 25A and 25B are input to the control circuit 26.

The multiplier circuit 33 multiplies the X polarization power signal by the Y polarization power signal, and generates a monitor signal representing the result of multiplication. The generated monitor signal is input to the drive parameter determination unit 34. On the basis of this monitor signal, the drive parameter determination unit 34 determines a drive parameter to control the polarization controller 21. Then the drive parameter determination unit 34 controls the polarization controller 21 with the control signal representing the determined drive parameter.

The feedback control by the control circuit 26 illustrated in FIG. 9 is essentially the same as the method described with reference to FIGS. 7, 8A and 8B. Therefore, the polarization state of the input polarization multiplexed optical signal is controlled so that the monitor signal (a product of Vx and Vy) output from the multiplier circuit 33 approaches an extremum. In FIG. 7, V_total obtained by the adder circuit 31 and V_total obtained by the multiplier circuit 33 do not have the same characteristic. In either case, however, V_total has its extremum at the control point where the bit error rates of the X polarization channel and the Y polarization channel become substantially identical. Therefore, even in the configuration illustrated in FIG. 9, the overall bit error rate of the X polarization channel and the Y polarization channel may also decrease if the polarization of the input polarization multiplexed optical signal is controlled so that V_total corresponding to the monitor signal approaches an extremum.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. A polarization multiplexing optical receiver, comprising:
    a polarization controller configured to control a polarization state of a polarization multiplexed optical signal;
    a polarization splitter configured to split the polarization multiplexed optical signal for which the polarization state is controlled by the polarization controller into a first polarization signal and a second polarization signal;
    a first optical/electrical converter configured to convert the first polarization signal into an electrical signal;
    a second optical/electrical converter configured to convert the second polarization signal into an electrical signal;
    a first RF-power detector configured to detect a power of an output signal from the first optical/electrical converter;
    a second RF-power detector configured to detect a power of an output signal from the second optical/electrical converter; and
    a controller configured to control the polarization controller so that either a sum or a product of an output voltage from first optical/electrical converter detected by the first RF-power detector and an output voltage from the second optical/electrical converter detected by the second optical/electrical converter approaches an extremum.

2. The polarization multiplexing optical receiver according to claim 1, wherein
    the controller controls the polarization controller using a monitor signal representing a sum of the first and second optical power signals.

3. The polarization multiplexing optical receiver according to claim 2, wherein
    the controller controls the polarization controller so that the monitor signal approaches an extremum.

4. The polarization multiplexing optical receiver according to claim 1, wherein
    the controller controls the polarization controller using a monitor signal representing a product of the first and second optical power signals.

5. The polarization multiplexing optical receiver according to claim 4, wherein
    the controller controls the polarization controller so that the monitor signal approaches an extremum.

6. The polarization multiplexing optical receiver according to claim 1, wherein
    the controller has a converter to convert the first and second optical power signals respectively into first and second digital values, and controls the polarization controller using a digital operation utilizing the first and second digital values.

7. A polarization multiplexing optical receiving circuit used in a polarization multiplexing optical receiver, wherein the polarization multiplexing optical receiver includes a polarization controller to control a polarization state of a polarization multiplexed optical signal and a polarization splitter to split the polarization multiplexed optical signal for which the polarization state is controlled by the polarization controller into a first polarization signal and a second polarization signal, the polarization multiplexing optical receiving circuit comprising:
- a first optical/electrical converter configured to convert the first polarization signal into an electrical signal;
- a second optical/electrical converter configured to convert the second polarization signal into an electrical signal;
- a first RF-power detector configured to detect a power of an output signal from the first optical/electrical converter;
- a second RF-power detector configured to detect a power of an output signal from the second optical/electrical converter; and
- a controller configured to control the polarization controller so that either a sum or a product of an output voltage from first optical/electrical converter detected by the first RF-power detector and an output voltage from the second optical/electrical converter detected by the second optical/electrical converter approaches an extremum.

8. A polarization multiplexing transmission system, comprising:
- a polarization multiplexing optical transmitter configured to transmit a polarization multiplexed optical signal; and
- a polarization multiplexing optical receiver configured to receive the polarization multiplexed optical signal, wherein the polarization multiplexing optical receiver includes:
    - a polarization controller configured to control a polarization state of the polarization multiplexed optical signal;
    - a polarization splitter configured to split the polarization multiplexed optical signal for which the polarization state is controlled by the polarization controller into a first polarization signal and a second polarization signal;
    - a first optical/electrical converter configured to convert the first polarization signal into an electrical signal;
    - a second optical/electrical converter configured to convert the second polarization signal into an electrical signal;
    - a first RF-power detector configured to detect a power of an output signal from the first optical/electrical converter;
    - a second RF-power detector configured to detect a power of an output signal from the second optical/electrical converter; and
    - a controller configured to control the polarization controller so that either a sum or a product of an output voltage from first optical/electrical converter detected by the first RF-power detector and an output voltage from the second optical/electrical converter detected by the second optical/electrical converter approaches an extremum.

* * * * *